(12) United States Patent
Carroll

(10) Patent No.: US 11,543,158 B2
(45) Date of Patent: Jan. 3, 2023

(54) METHOD OF MANUFACTURING A SOLAR HEAT EXCHANGER

(71) Applicant: ASPIRE POLYMERS PTY LTD, Hastings (AU)

(72) Inventor: Paul Carroll, Hastings (AU)

(73) Assignee: Aspire Polymers Pty Ltd

(*) Notice: Subject to any disclaimer, the term of this patent is extended or adjusted under 35 U.S.C. 154(b) by 37 days.

(21) Appl. No.: 16/763,098

(22) PCT Filed: Nov. 12, 2018

(86) PCT No.: PCT/AU2018/000219
§ 371 (c)(1),
(2) Date: May 11, 2020

(87) PCT Pub. No.: WO2019/090383
PCT Pub. Date: May 16, 2019

(65) Prior Publication Data
US 2021/0370563 A1    Dec. 2, 2021

(30) Foreign Application Priority Data

Nov. 10, 2017  (AU) ................ 2017904561

(51) Int. Cl.
| | | |
|---|---|---|
| *B29C 45/14* | (2006.01) |
| *F24S 80/30* | (2018.01) |
| *F24S 10/70* | (2018.01) |
| *F16L 37/113* | (2006.01) |
| *F24S 20/67* | (2018.01) |
| *F24S 25/60* | (2018.01) |
| *F24S 80/70* | (2018.01) |
| *F28F 9/18* | (2006.01) |
| *F24S 80/00* | (2018.01) |

(Continued)

(52) U.S. Cl.
CPC ........ *F24S 80/30* (2018.05); *B29C 45/14065* (2013.01); *B29C 45/14336* (2013.01); *B29C 45/14467* (2013.01); *F16L 37/113* (2013.01); *F24S 10/73* (2018.05); *B29C 2045/14131* (2013.01); *B29C 2045/14524* (2013.01); *B29K 2021/003* (2013.01); *B29L 2031/18* (2013.01); *F24S 20/67* (2018.05); *F24S 80/70* (2018.05); *F24S 2025/6005* (2018.05); *F24S 2080/015* (2018.05); *F28F 9/187* (2013.01); *F28F 2255/143* (2013.01)

(58) Field of Classification Search
None
See application file for complete search history.

(56) References Cited

U.S. PATENT DOCUMENTS 4,312,687 A * 1/1982 Sigworth, Jr. .... B29C 45/14336
156/245
4,352,772 A * 10/1982 Bezner ................ B29C 66/1122
264/229

(Continued)

OTHER PUBLICATIONS

International Search Report (ISR) of PCT/AU2018/000219.

*Primary Examiner* — Edmund H Lee
(74) *Attorney, Agent, or Firm* — Anderson Gorecki LLP

(57) ABSTRACT

A solar heat exchanger for heating water which includes an array of tubes, an injection molded manifold there being connections between each tube in the array and the manifold which are over molded to seal the tubes to the manifold.

6 Claims, 23 Drawing Sheets

(51) Int. Cl.
 *B29K 21/00* (2006.01)
 *B29L 31/18* (2006.01)

(56) References Cited

U.S. PATENT DOCUMENTS

| | | | | |
|---|---|---|---|---|
| 6,787,116 | B2 * | 9/2004 | Williams | B29C 45/14336 |
| | | | | 428/36.92 |
| 7,112,297 | B2 * | 9/2006 | Williams | B29C 45/14336 |
| | | | | 264/277 |
| 10,458,586 | B2 * | 10/2019 | Rupkalvis | B29C 45/44 |
| 2007/0227529 | A1 | 10/2007 | Rubio | |
| 2012/0145142 | A1 | 6/2012 | Clark | |

* cited by examiner

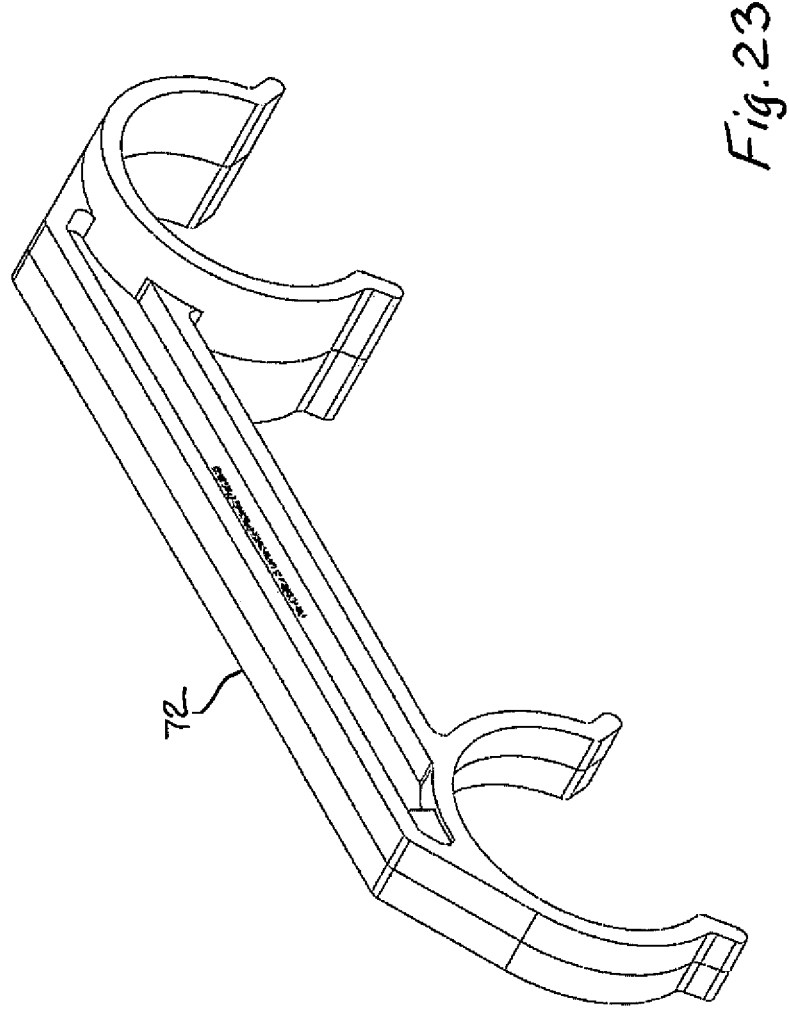

METHOD OF MANUFACTURING A SOLAR HEAT EXCHANGER

TECHNICAL FIELD

This invention relates to improvements in solar water heating systems which include a solar collector panel, which is usually disposed on a roof, and which includes an array of plastic tubes connected to a plastic water manifold. Typically one end of each array of tubes is connected to a water supply manifold and the other end is connected to a water return manifold.

BACKGROUND TO THE INVENTION

It is important to provide a watertight connection between the tubes and manifolds of such solar panels. It is also important to provide sufficient strength to the attachment of the tubes to the manifold.

A method of forming such manifold and tube panels by over-moulding the supply and return manifolds to make water tight connections to the small bore solar collection tubes, was first proposed in U.S. Pat. No. 4,352,772 which over moulds the manifold onto the tubes. This approach has also been followed in U.S. Pat. Nos. 6,787,116, 7,112,297 and 9,227,353.

However these previous systems suffer from several problems:
 (a) Weakening of the solar collection tubes at the overmould due to a thinning of the wall section caused by the overmolding process. Exposure to side impact can then fracture the overmould, resulting in leaks.
 (b) The exposed threads on the manifold joining couplings are prone to damage during transport and installation. This creates difficulties for the installers.
 (c) The threads can undo with expansion and contraction. To overcome this, some manufacturers recommend that silicone sealant be applied to the threads during installation to act as a thread locker and seal the thread, but this is not always successful.
 (d) During installation, large collectors can be difficult to align for manifold connection, so that single face-to-face seals often leak due to bending stress at the coupling.

U.S. Pat. No. 6948687 discloses a sealing ring for joining two manifolds. A problem encountered with this type of joint is exposure to repeated thermal expansion and contraction cycles.

U.S. Pat. No. 6948687 also discloses a clamp for holding the manifold in position while allowing the manifold to expand and contract. Another proposal using a plastic spring mechanism to take up thermal expansion, is disclosed in US 20110073105. These proposals for clamping the system to the roof do not adequately address avoidance of damaging the roof tiles.

It is an object of this invention ameliorate the prior art problems mentioned.

BRIEF DESCRIPTION OF THE INVENTION

In a first aspect this invention provides a solar heat exchanger for heating water which includes an array of tubes, an injection moulded manifold there being connections between each tube in the array and the manifold which are over moulded to seal the tubes to the manifold.

In another aspect this invention provides a solar heat exchanger for heating water, said heater comprising:
  an array of tubes, and
  an injection moulded manifold,
  there being a respective connection between the manifold and each tube in the array, wherein each said connection is overmoulded with a plastics compound that adheres to both the manifold and the tubes and thereby seals the tubes to the manifold.

Said manifold may have an array of spigots onto which each tube is pushed and each spigot is provided with a recess at its base adjacent the manifold so that during said overmoulding, said plastic compound flows into the recess to mechanically anchor the tubes, the overmoulding and the manifold together.

Said manifold is preferably a rigid moulding of a polypropylene and the tubes are formed of a flexible polypropylene material.

Said flowable plastics compound preferably chemically adheres to the spigots, the manifold body and the tubes.

In a further aspect this invention provides a method of joining adjacent manifolds together using a cam locking system with a triple seal, to provide improved leak resistance and prevent loosening when exposed to repeated thermal expansion and contraction cycles.

In a further aspect this invention provides a method of joining adjacent manifolds together using a cam locking system with a triple seal, to provide improved leak resistance and prevent loosening when exposed to repeated thermal expansion and contraction cycles.

In a further aspect the invention provides a solar heat exchanger in which the manifolds are connected together using a threadless connection arrangement in which the end of one manifold tube carries at least two annular seals and the internal bore of the end of the adjacent manifold tube is cammed and when locked, the connection of the two manifolds is resistant to loosening when exposed to repeated thermal expansion and contraction cycles.

In a further aspect the invention provides a system for securing a solar heat exchanger to a tiled roof which includes: a wire hook for attachment to a roof batten under the tiles, an adjustable connection strip connected to said wire hook, and a manifold clamp attached to said adjustable connection strip.

The method of connecting the manifolds together is by cam locking a seal with a proprietary ⅛ turn hand tool. There are 2 other O rings per connection which prevent distortion at the union and make for a triple seal against leakage. The triple seal design ensues correct self alignment and a seal without bending stress. There are no external threads prone to impact or damage.

In one aspect, adjacent manifolds are joined together using a cam locking system with a triple seal, to provide improved leak resistance and prevent loosening when exposed to repeated thermal expansion and contraction cycles. The method of connecting the manifolds together is by cam locking a seal There are no external threads prone to impact or damage. The solar heat exchanger is secured to a tiled roof using a system consisting of clamps and an adjustable location strip for the batten wire hook. The clamp can also connect the return pipes to the manifold. This arrangement avoids drilling and damaging tiles. This arrangement also accommodates large thermal expansion of the solar tube mat. The cam lock is designed to prevent loosening of the connection over time.

The solar tubes are first pushed onto an injection moulded manifold which has an array of spigots and then this assembly is overmoulded with a plastic compound that adheres to both manifold and tube. The overmoulding also flows into a recess at the base of each spigot that mechanically anchors the 3 pieces together.

In a further aspect this invention provides a system for clamping the solar heat exchanger to a tiled roof which consists of clamps and an adjustable location strip for the batten wire hook. Using a clamp that is held to a batten by a wire hook and an adjustable connection. The clamp can also connect the return pipes to the manifold.

This arrangement avoids drilling and damaging tiles. The saving in installation time may enable the system to be priced lower than competitors.

The holding clamp is easy to install without disturbing a tiled roof and has an adjustable length to ensure that the manifolds are installed straight and true without stress on the couplings.

Allowing for thermal expansion while holding the collectors securely to the roof is important. For example a polypropylene tubular mat expands 2.0 mm/m/10° C. The collectors will experience temperature ranges from freezing to 80° C. when they are sitting idle on a roof under summer heatwave conditions. Therefor there needs to be an allowance for approx 64.0 mm expansion over 80° C. range for a 4.0 m long collector. If units are installed on a cold day without clearance, then collectors will buckle & damage. Also, if they are installed on a hot day without clearance they will pull out of the clamps under cold conditions.

This invention addresses this problem by letting the collector manifolds float in the clamps. The installer always places the bottom manifold in the bottom clamps first. The top manifold clamp is engraved with a temperature scale ranging from zero to 40° C. Depending on the temperature at the time of installation, the installer fixes the top clamps with the centre of the top manifold lining up with the 0-40° C. temperature scale according to the approximate day temp. This will ensure that there will always be enough clearance for expansion.

BRIEF DESCRIPTION OF THE DRAWINGS

In order that the invention may be more fully understood there will now be described, by way of example only, preferred embodiments and other elements of the invention with reference to the accompanying drawings where:

FIG. 23 shows a return pipe bracket previously seen in FIG. 13.

DETAILED DESCRIPTION OF EMBODIMENTS OF THE INVENTION

Figure 1:
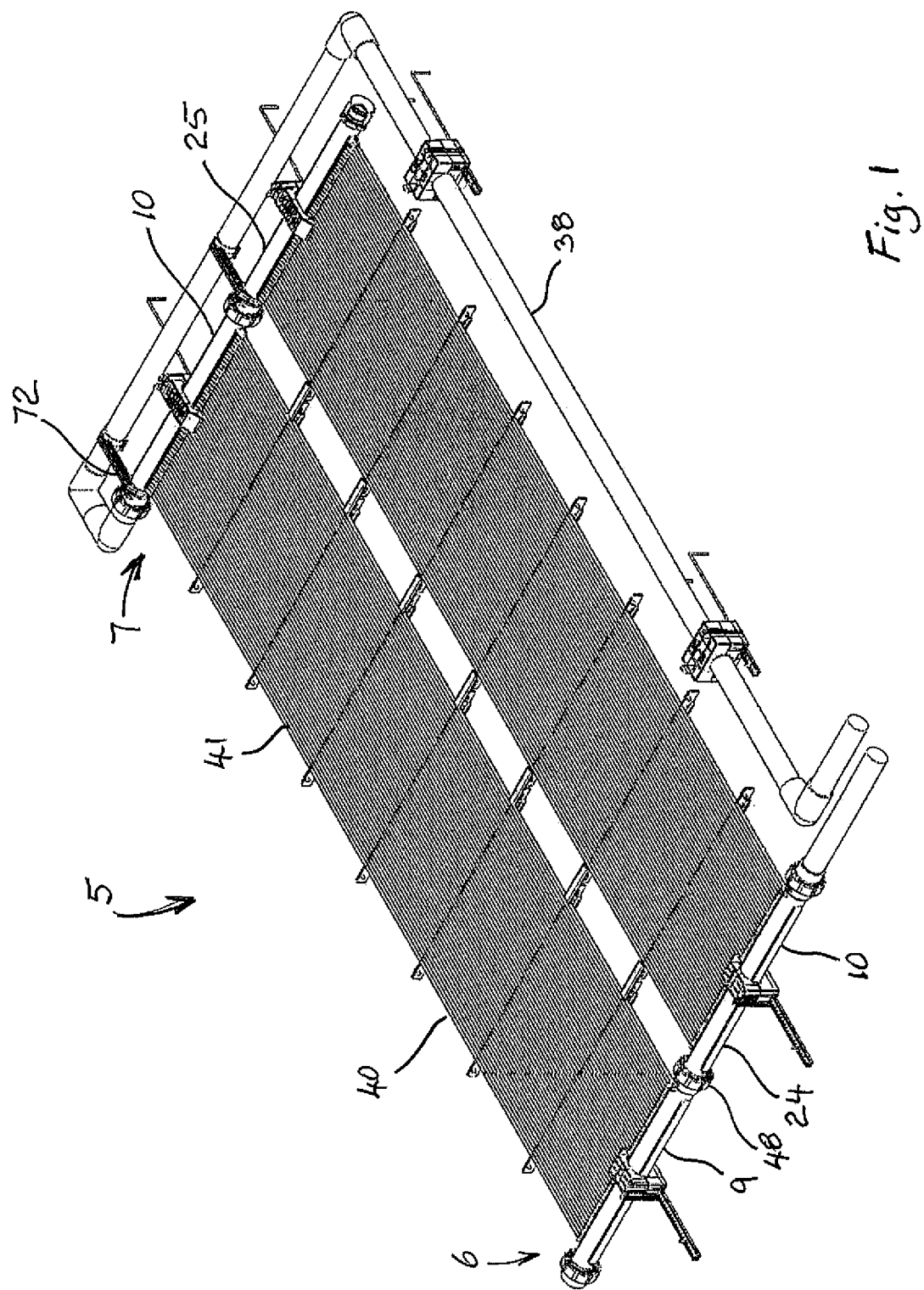
FIG. 1 is a perspective view from above of a solar heat exchange assembly according to a first embodiment of this invention and comprising a modular solar mat and manifold system.
Figure 2:
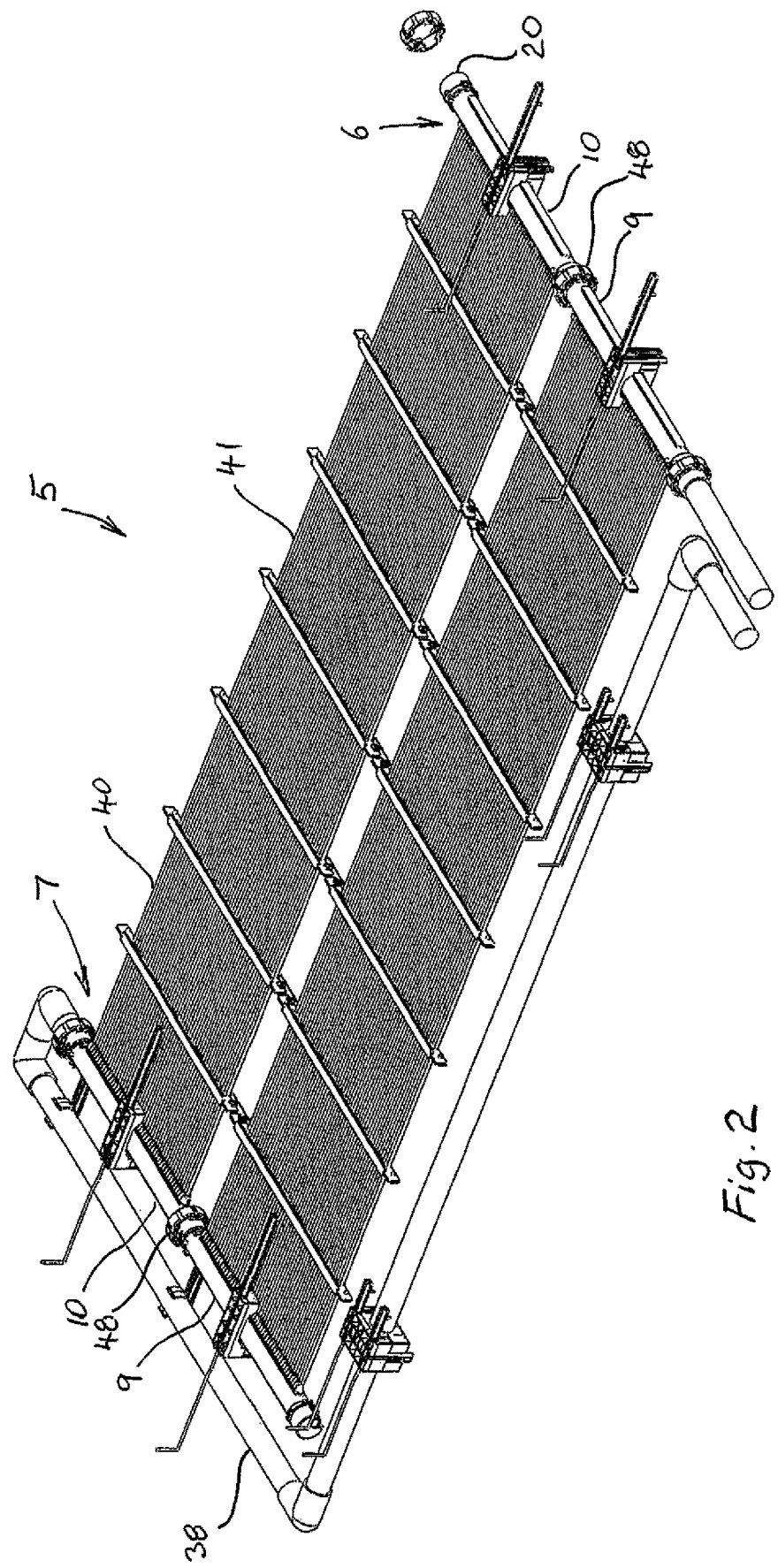
FIG. 2 is a perspective view from below of the assembly in FIG. 1.
Figure 3:
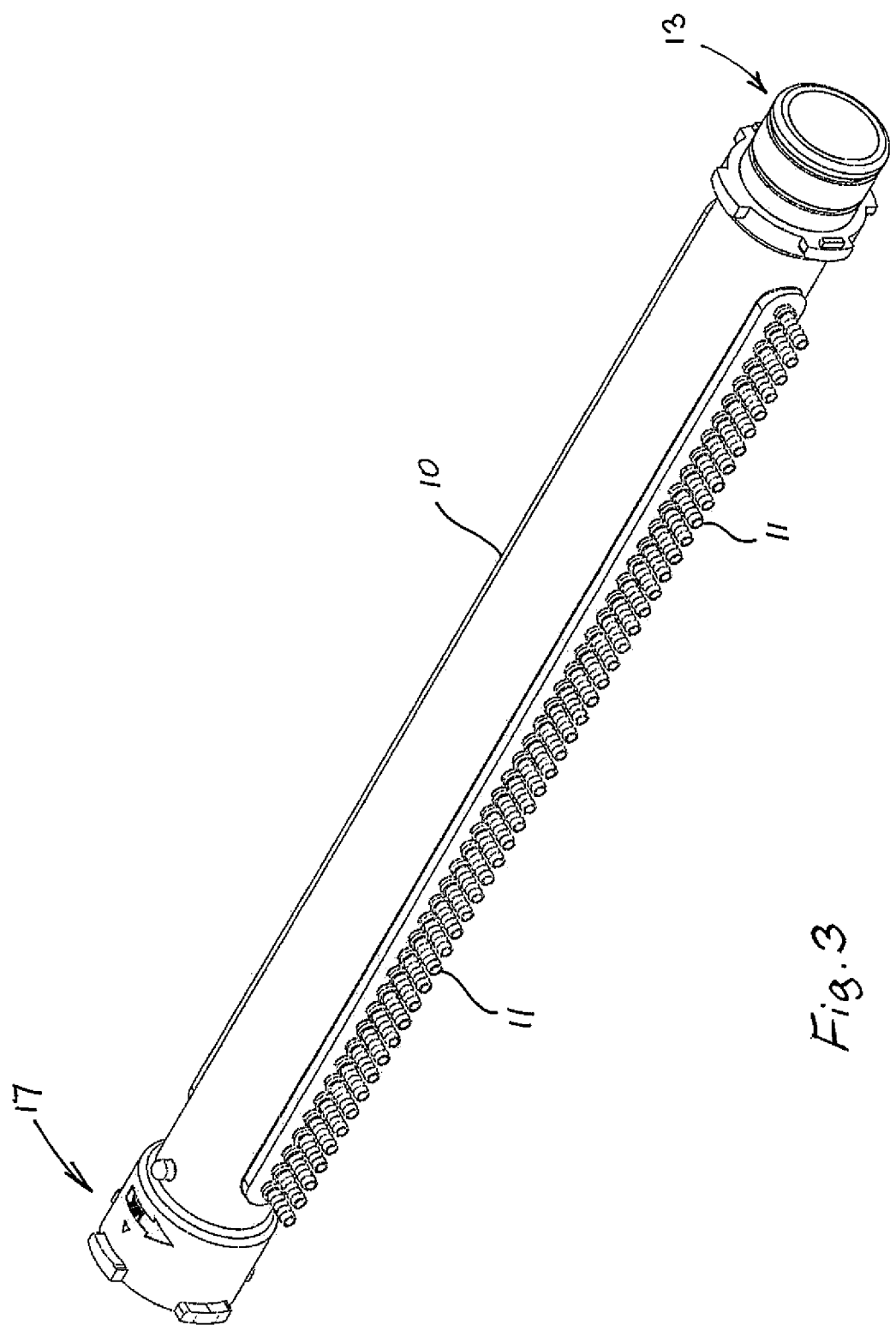
FIG. 3 is a perspective view of a manifold body component forming part of the assembly in FIG. 1.
Figure 4:
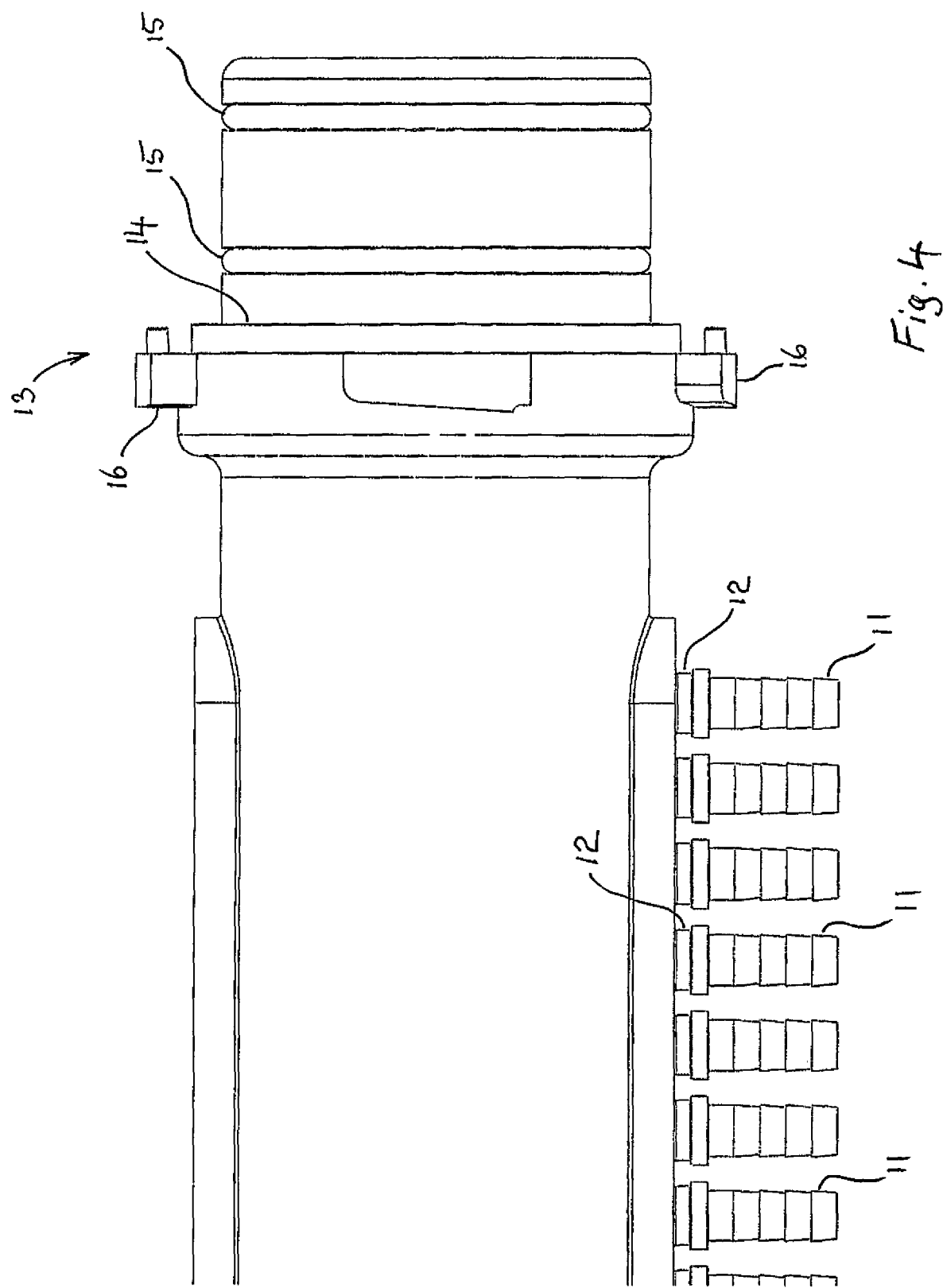
FIG. 4 is a view from above of portion of the manifold body component shown in FIG. 3.
Figure 5:
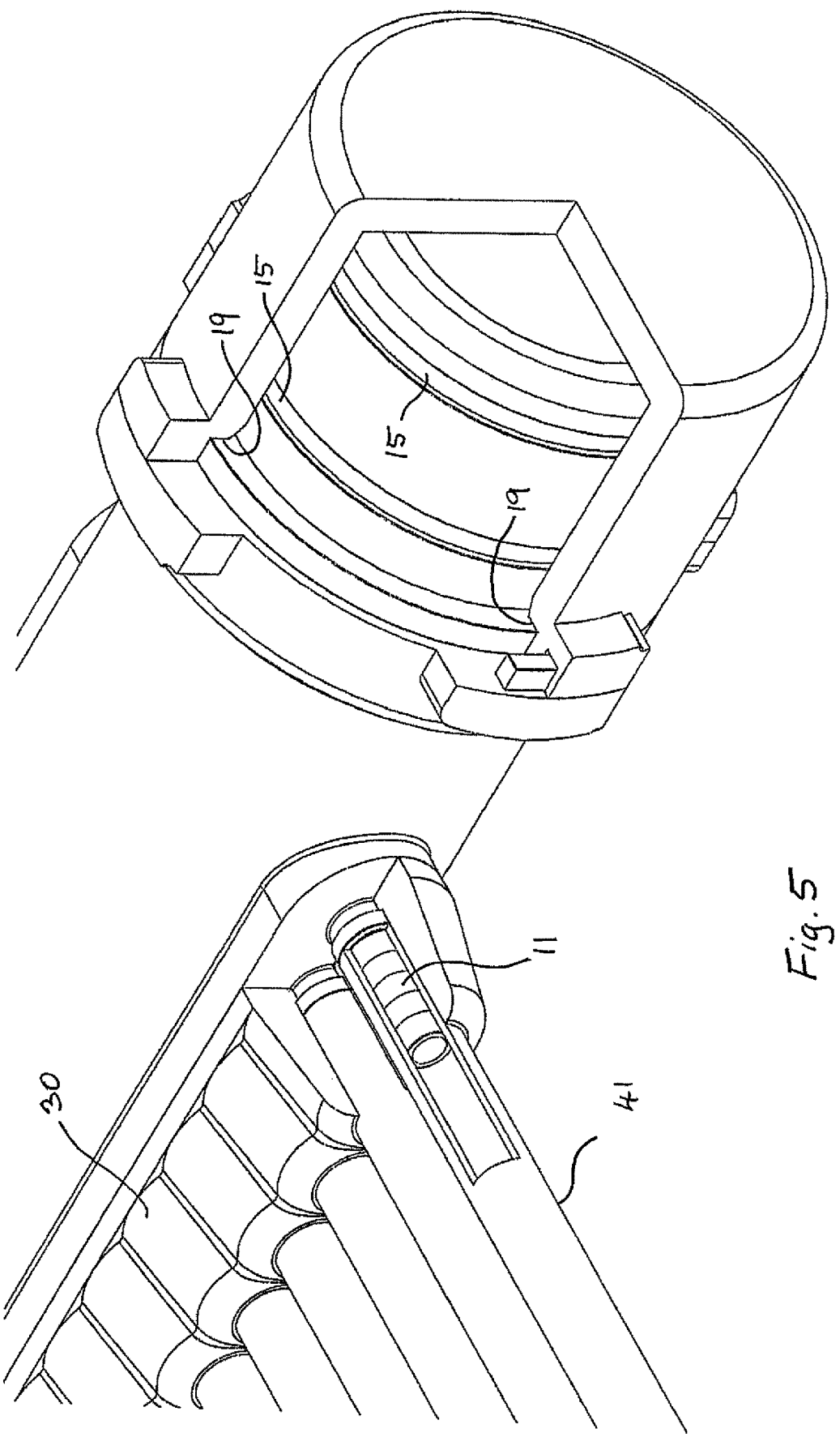
FIG. 5 is an enlarged partial cutaway view of portion of the assembly in FIG. 1.

The solar heating assembly 5 in FIGS. 1 and 2 is a heat exchanger for collecting solar radiation and using it to heat water, preferably for warming a swimming pool. It includes a solar mat 40, comprising an array of parallel tubes 41 whose lower ends 6 are affixed to an inlet manifold assembly 24, and whose upper ends 7 are affixed to an outlet manifold assembly 25. Associated pipework 38 brings water to the inlet manifold assembly and receives warmed water from the outlet manifold assembly.

The upper and lower manifold assemblies each comprise two identical manifolds 10 connected end to end by means of a locking ring at each connection 48. Identical locking rings are also used to connect the manifold assemblies to the associated pipework 38.

Figure 6:
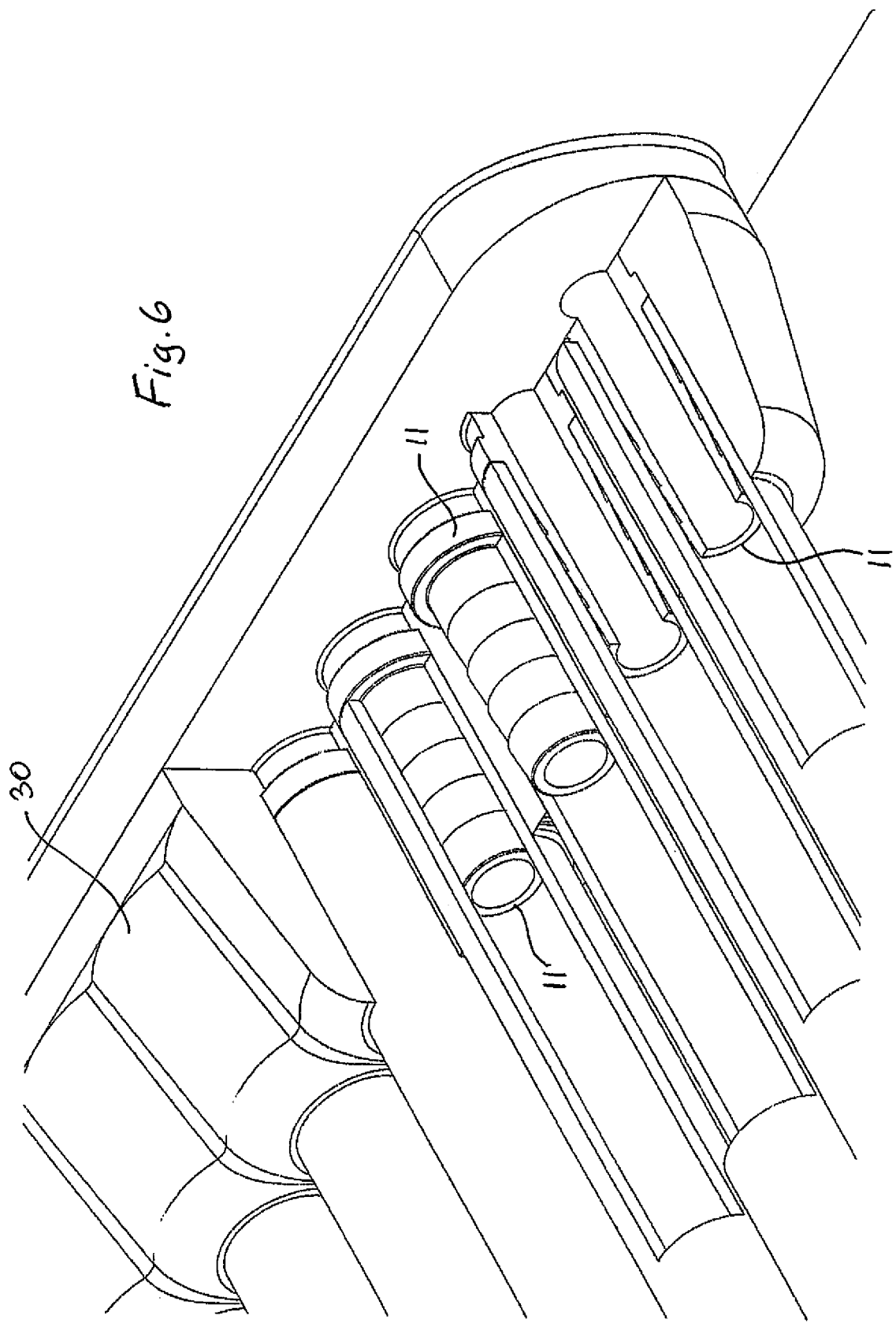
FIG. 6 is an enlargement of portion of FIG. 5 which has been cut away further.

Each manifold 10 is a single rigid injection moulding having a tubular body 9 and an array of spigots 11 along its length. Each spigot is adapted to receive a respective tube 41 slid over it and incorporates an annular external recess 12 at its base adjacent the manifold from which it extends. When manufacturing the assembly, the tubular ends of the tubes 41 of the mat 40 are slid onto their respective spigots 11. To complete the joining of the injection moulded manifold 10 to the mat 40, the junction of the mat 40 and manifold spigots 11 is overmoulded with a polymer composition 30 that adheres to the surfaces of the tubes 41 and the manifold 10. Preferably the overmoulding compound is a thermoplastic elastomer (TPE) or rubber-like material which is cured in the mould. Within the mould the composition 30 flows around the tubes 41 and fills the recesses 12 at the base of the spigots 11 so that when the overmould composition is cured. The overmoulding is continuous between adjacent spigots. The overmould's penetration into the annular recess 12 on each spigot provides a mechanical lock of the mat onto the manifold that is resistant to forces that could separate the mat from the manifold or initiate leaks at the join. This provides superior resistance to leaking. FIG. 6 shows various cutaway views of tubes, spigots and overmoulding composition at a series of adjacent spigots.

Figure 7:
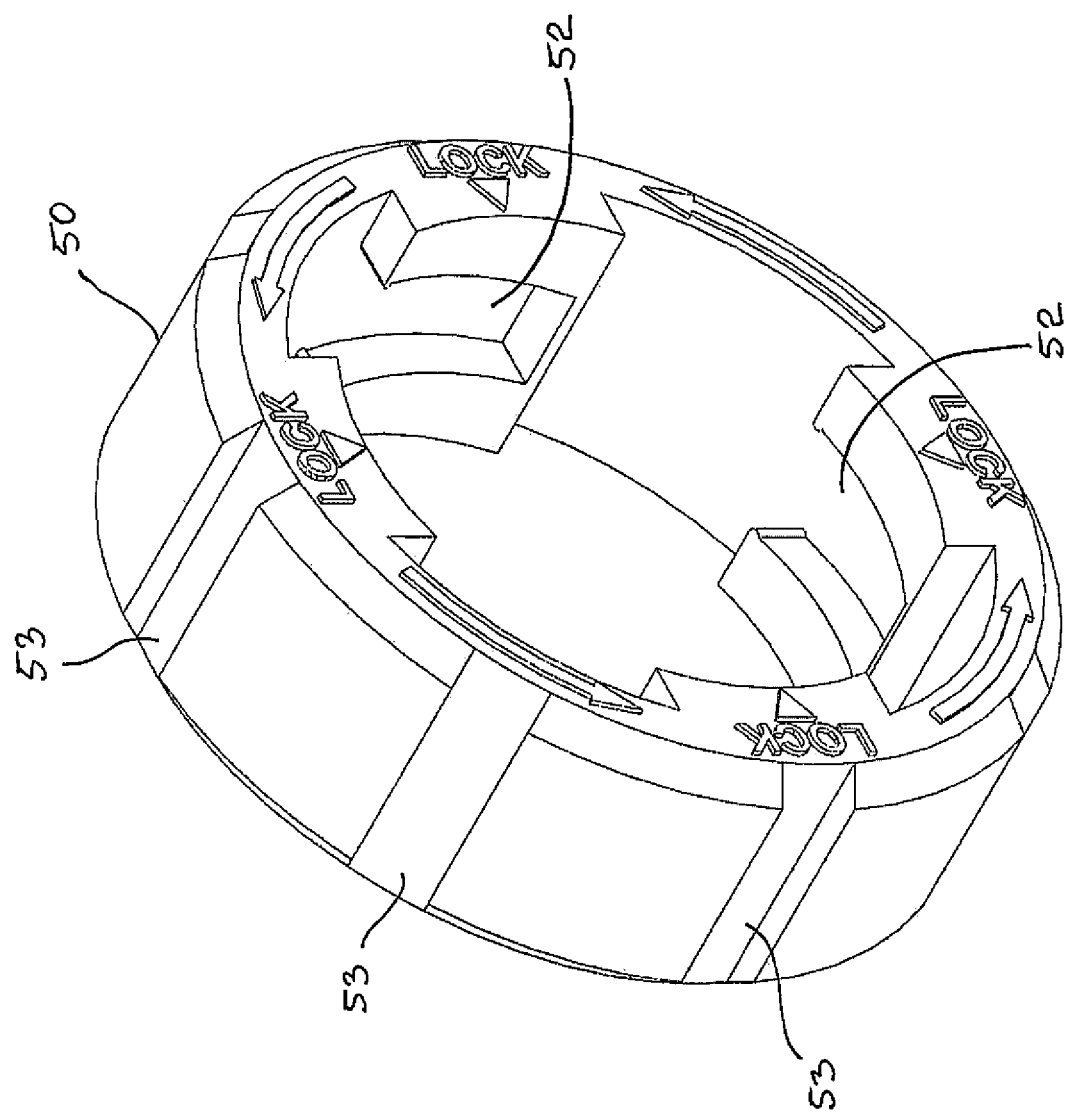
FIG. 7 is a perspective view of a locking ring used in the heat exchange assembly in FIG. 1.
Figure 8:
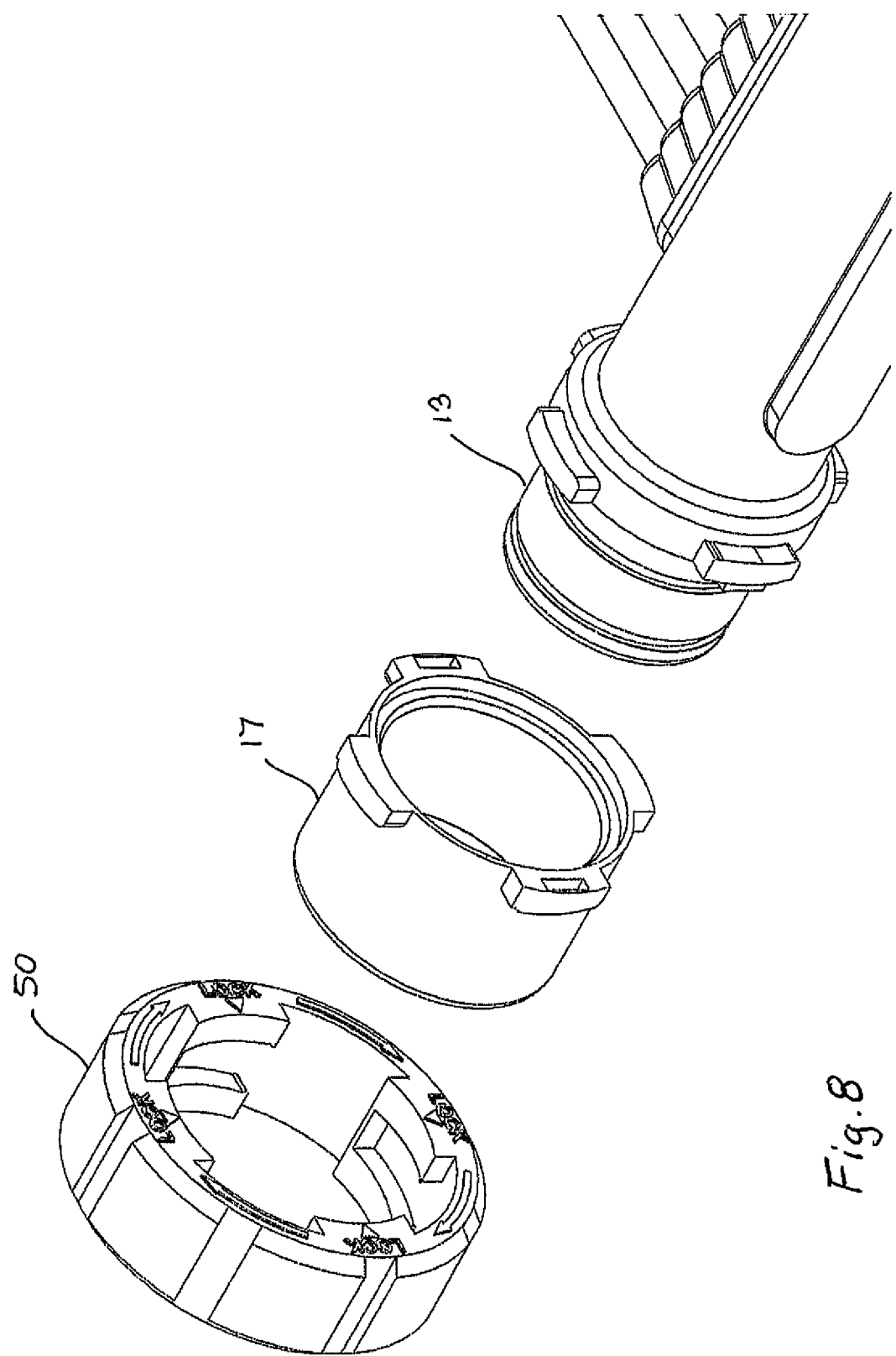
FIG. 8 is an exploded view of portion of the assembly in FIG. 1 prior to being assembled.
Figure 9:
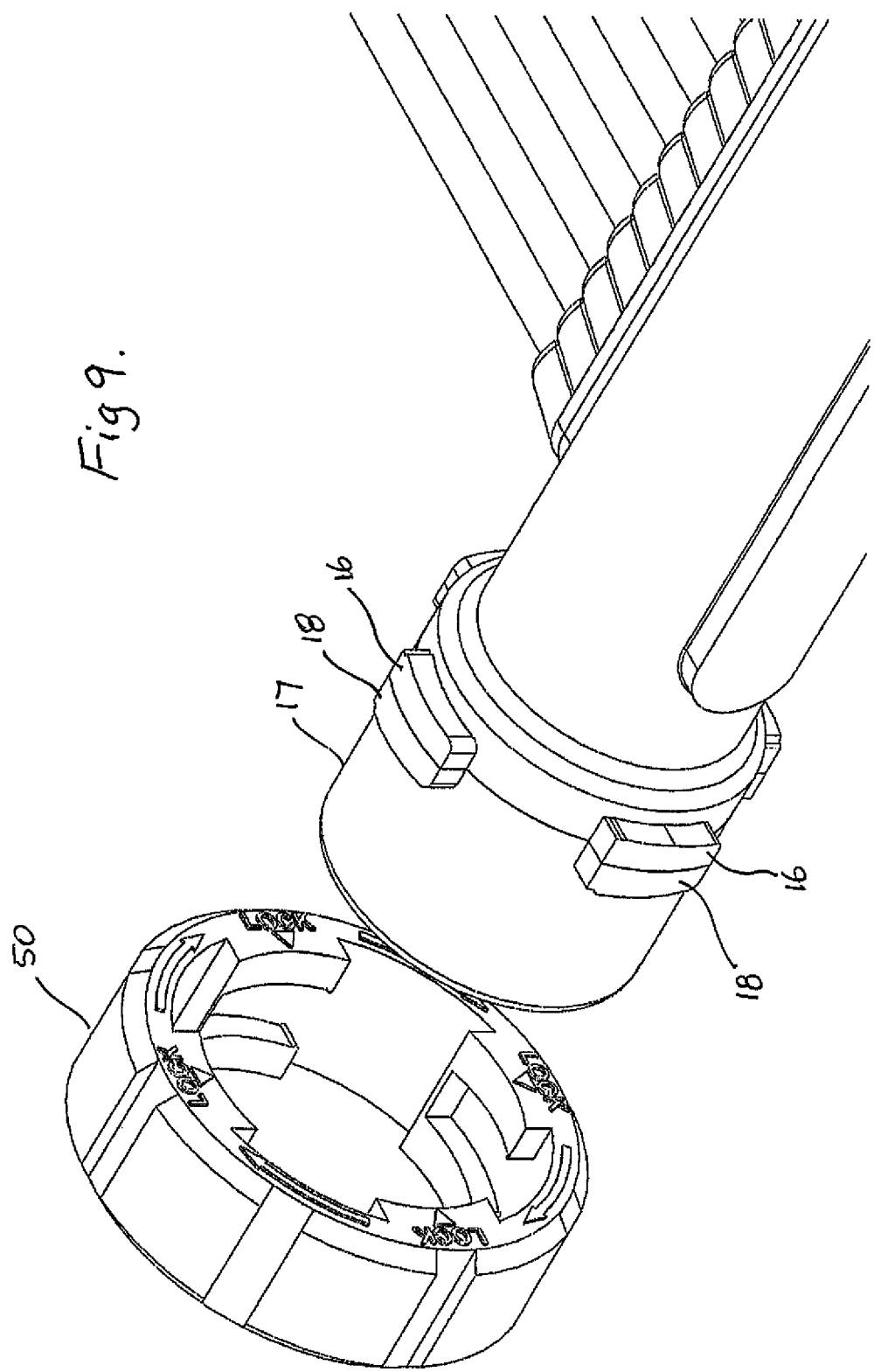
FIG. 9 is a view showing the components of FIG. 8 partially assembled.
Figure 10:
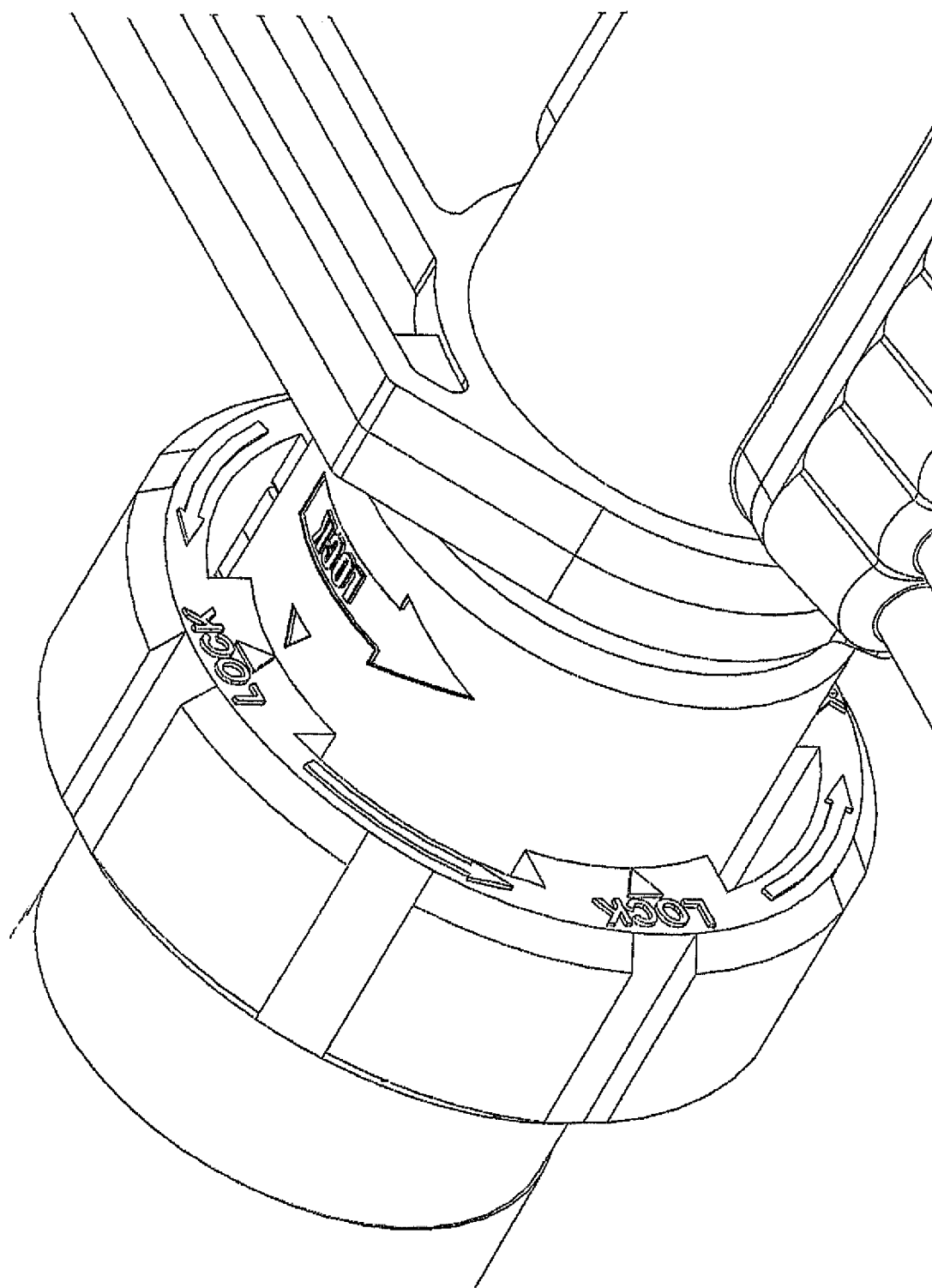
FIG. 10 is a view showing the components in FIG. 8 when assembled.

A locking element 50 in the form of a ring (best seen in FIG. 7) provides a clamp 60. The manifold is a rigid injection moulding and solar mat tubing is made of a semi flexible polypropylene.

A more robust connection between the tubes and the manifold is achieved by joining an injection moulded manifold to the tubes and overmolding with a polymer that fills recesses around the tubes and mechanically anchors the tubes to the manifold while being chemically adhered to both the tubes and the manifold. As a result of the overmoulding, the solar heat exchanger has a higher pressure rating and is more impact resistant.

The solar tubes are first pushed onto an injection moulded manifold which has an array of spigots and then this assembly is overmoulded with a plastic compound that adheres to both manifold and tube. The overmoulding also flows into a recess at the base of each spigot that mechanically anchors the 3 pieces together. Tests show that this does not create any weak points and improves the pressure rating and protects the connection from impact.

Each manifold 10 has a male end 13 carrying a square-section annular seal 14 and two O rings 15 in respective circumferential grooves. Each manifold 10 also has a female end 17 which has an internal diameter to match the external diameter of the male end 13. Both ends 13 and 17 have complementary lugs 16 and 18 which engage when a male and female end are joined. A recessed annular face 19 of the female end 17 bears against the seal 14 and the O-rings 15 bear outwards against the inside cylindrical wall of the female end.

An end cap 20 for closing one end of a manifold 10 with a male end 13 may be attached in the same way.

Figure 11:
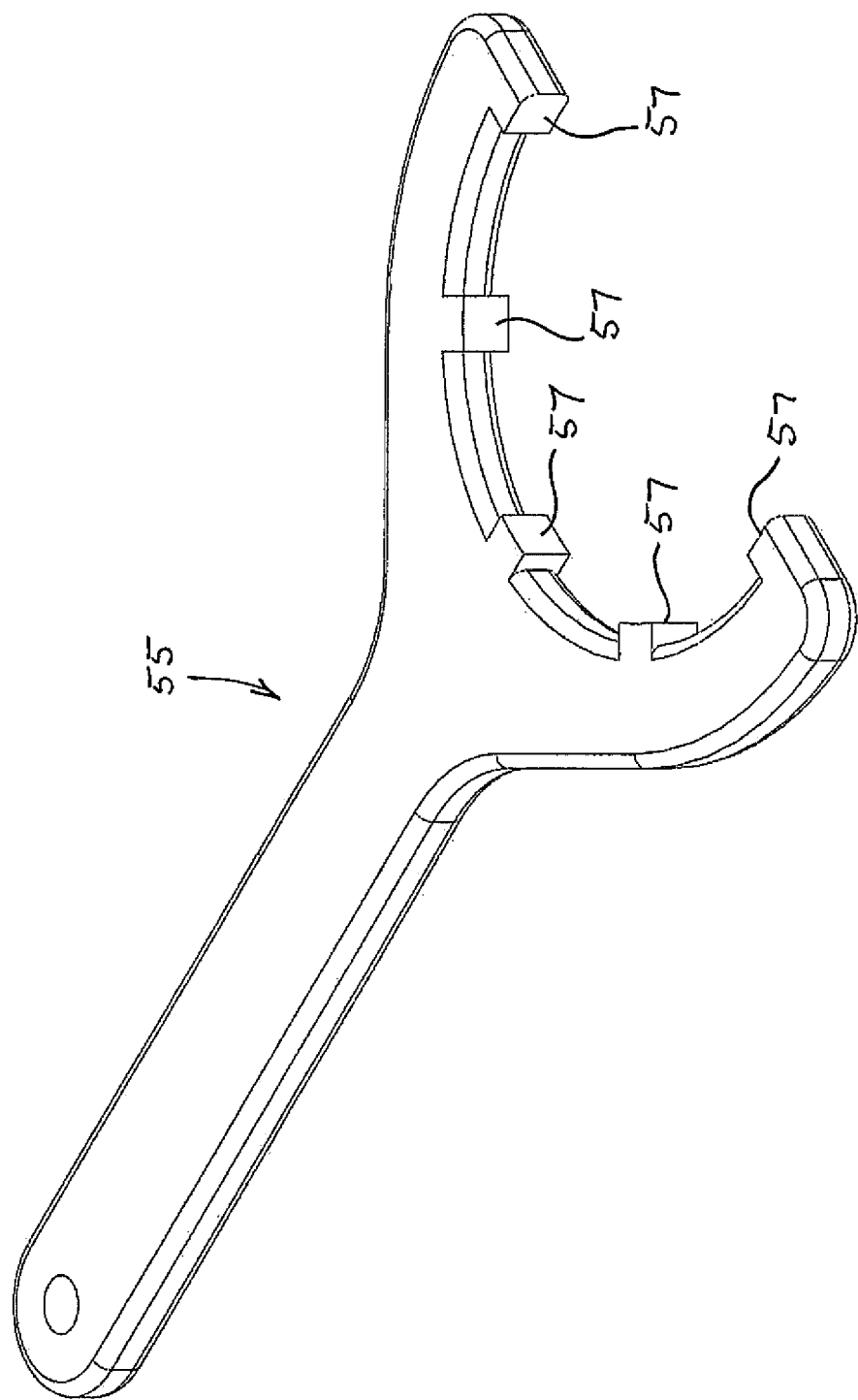
FIG. 11 shows a locking tool for use in this invention.
Figure 12:
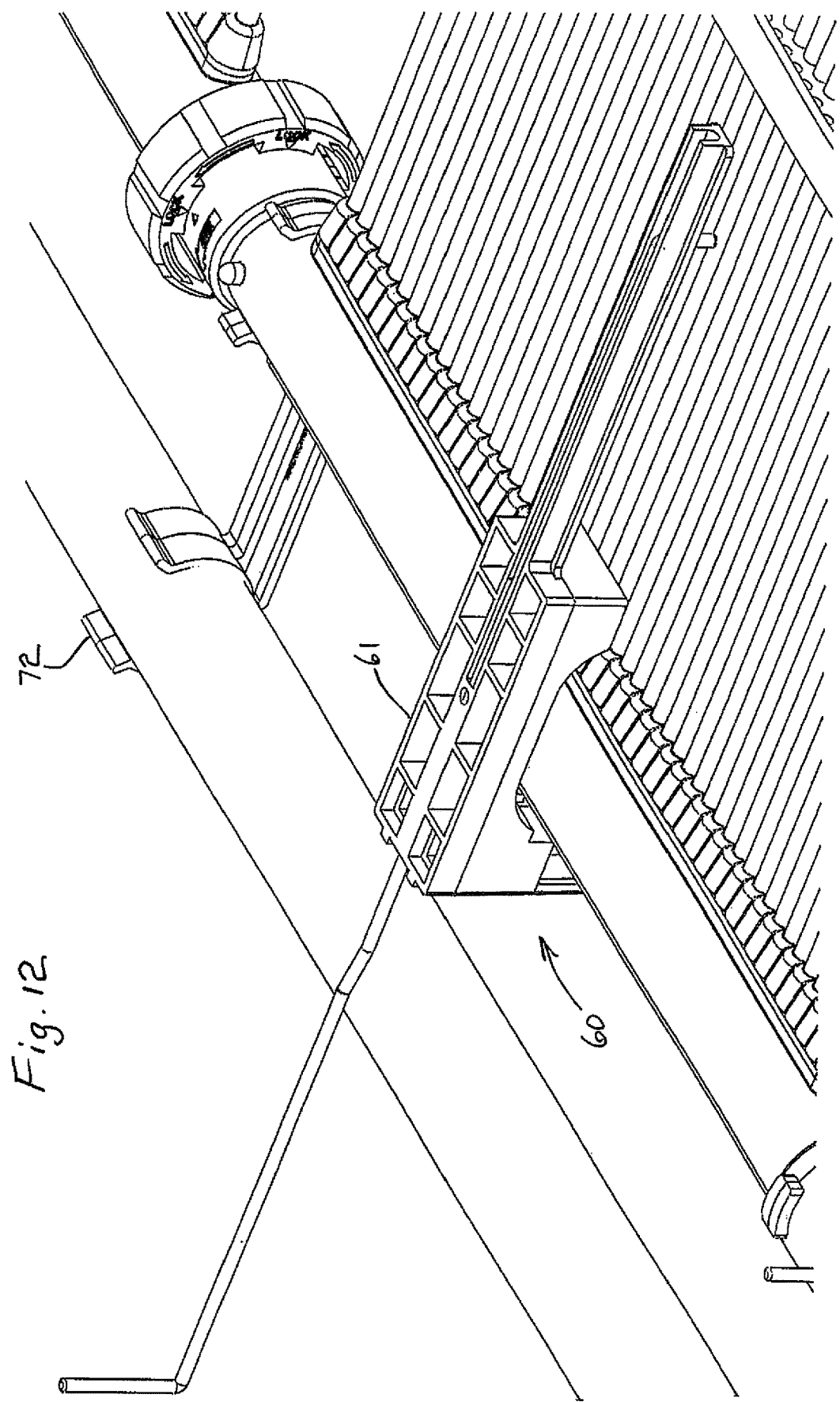
FIG. 12 is an enlarged detail from FIG. 2 showing an underneath view of an arrangement for fixing the upper end of the heat exchange assembly to a roof of a house.
Figure 13:
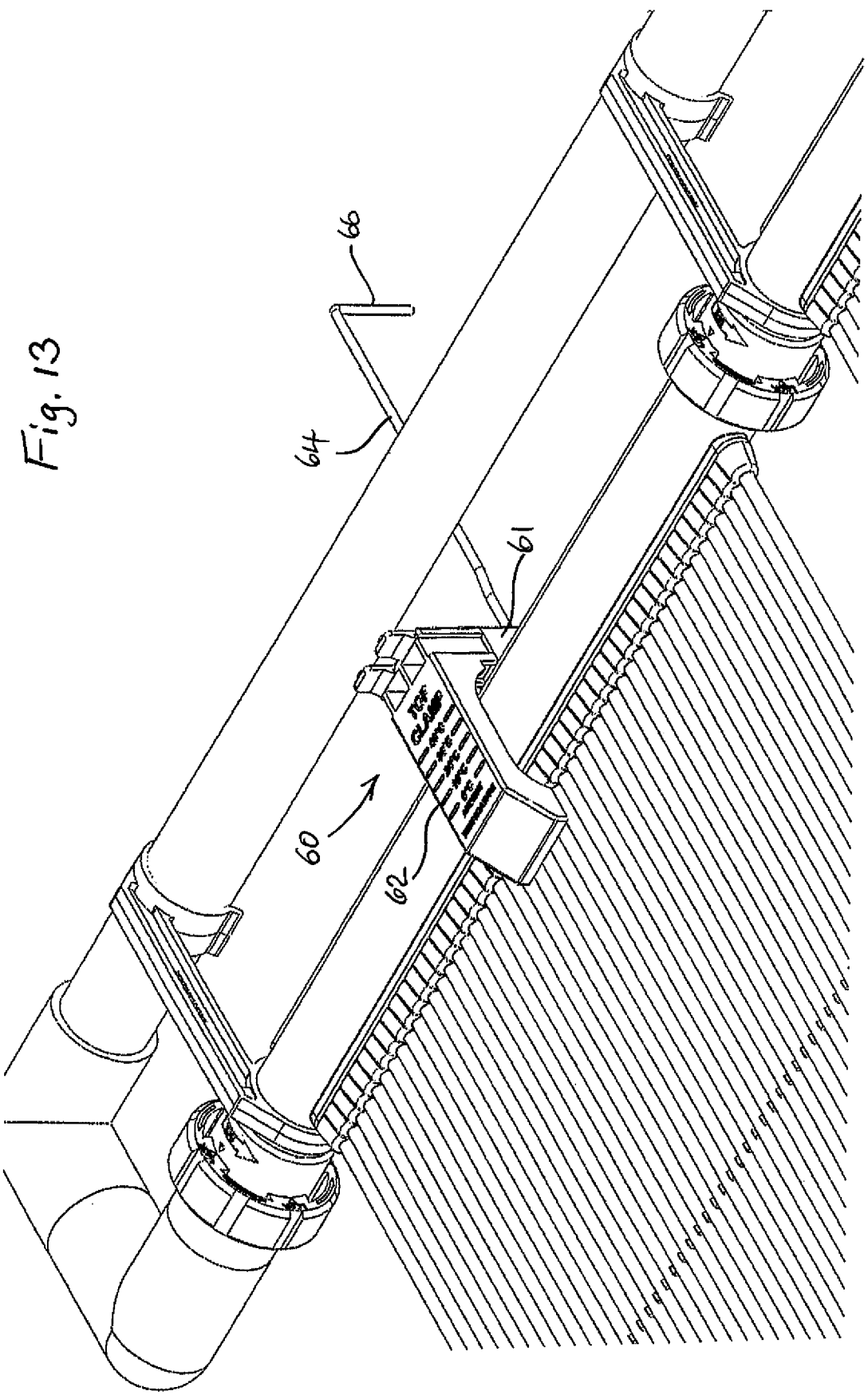
FIG. 13 shows a topside view of the fixing arrangement in FIG. 12.
Figure 14:
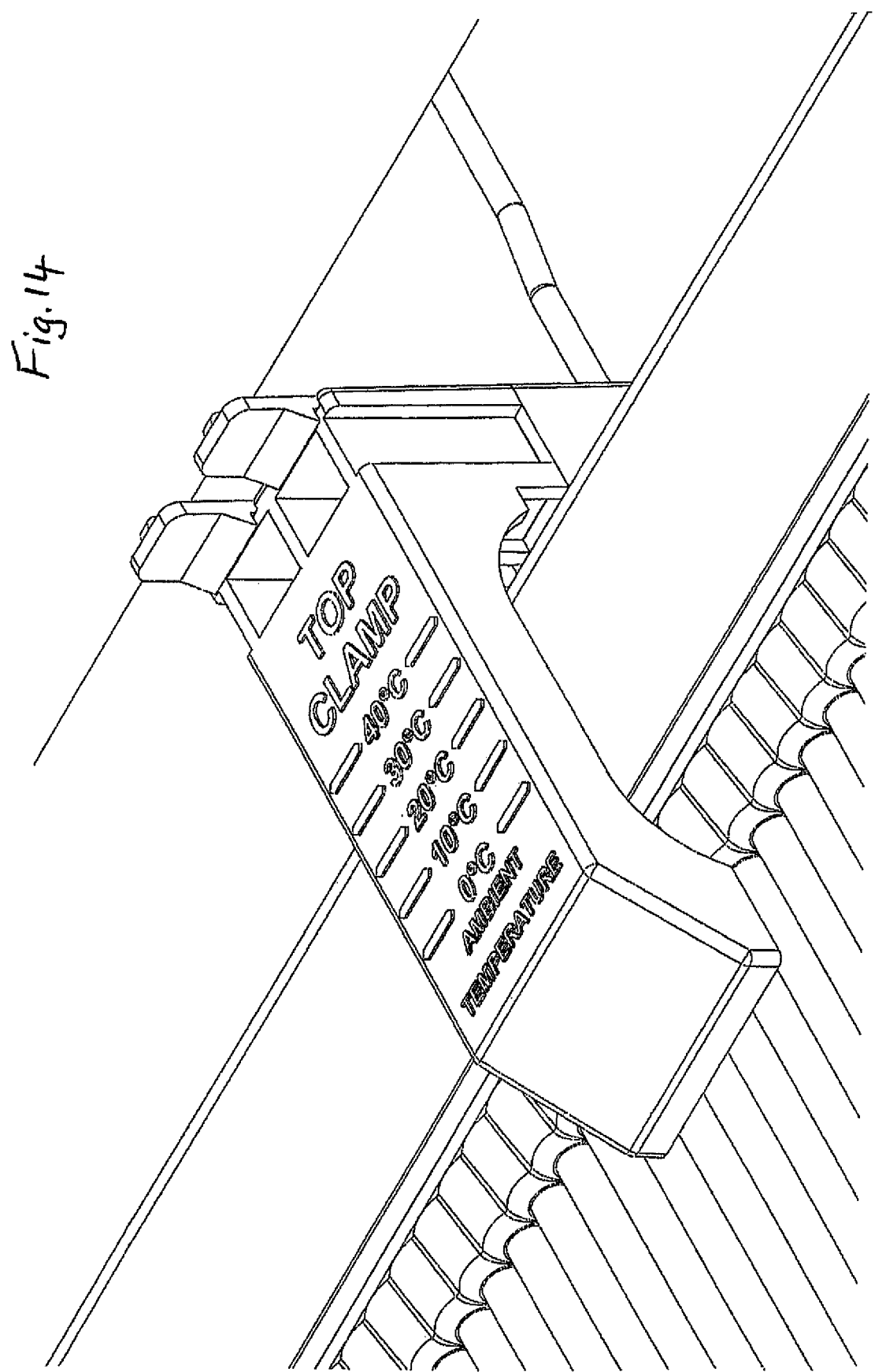
FIG. 14 shows a further enlarged detail of portion of FIG. 13.
Figure 15:
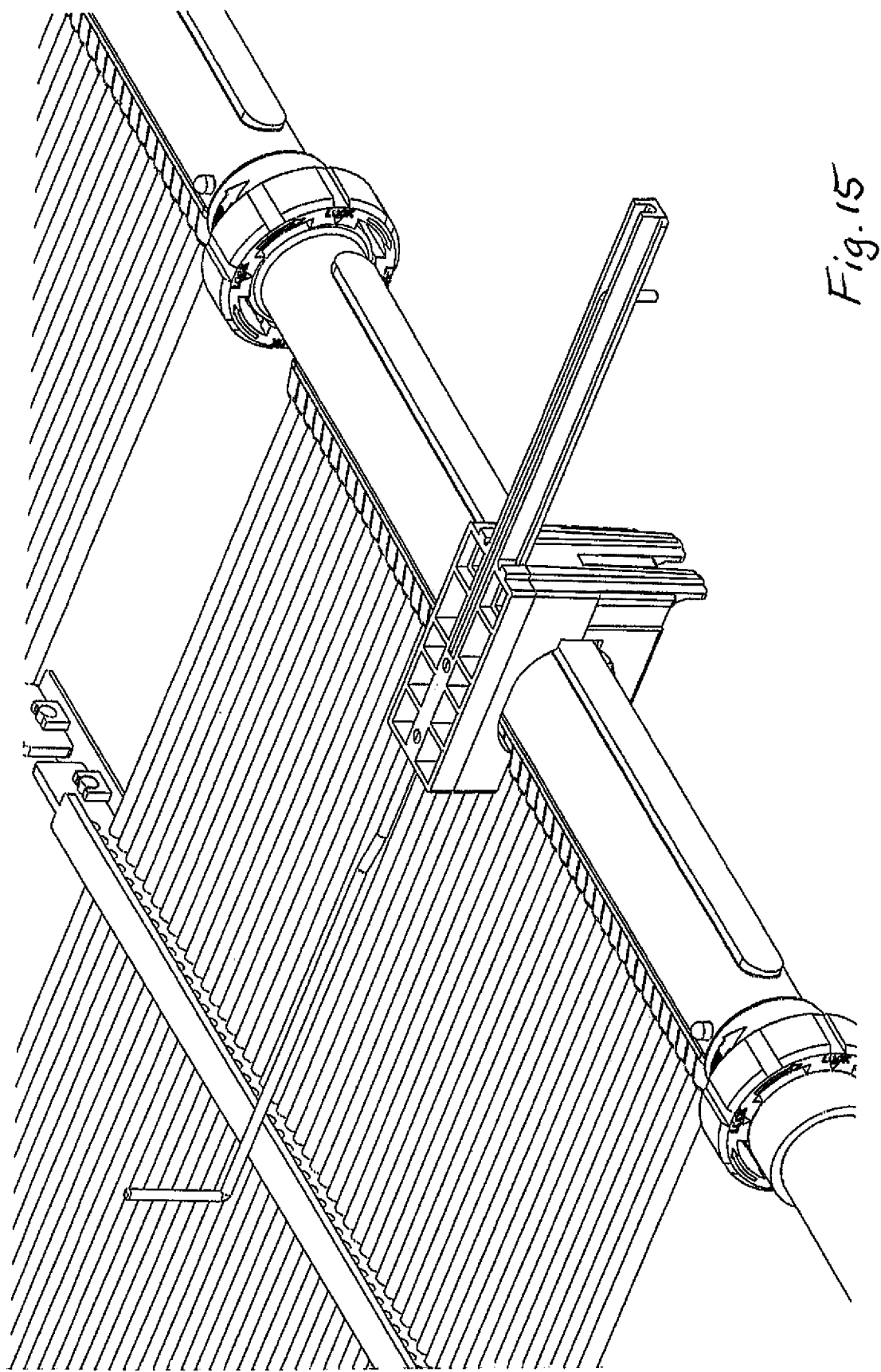
FIG. 15 is an enlarged detail from FIG. 2 showing an arrangement for fixing the lower end of the heat exchange assembly to the roof of a house.
Figure 16:
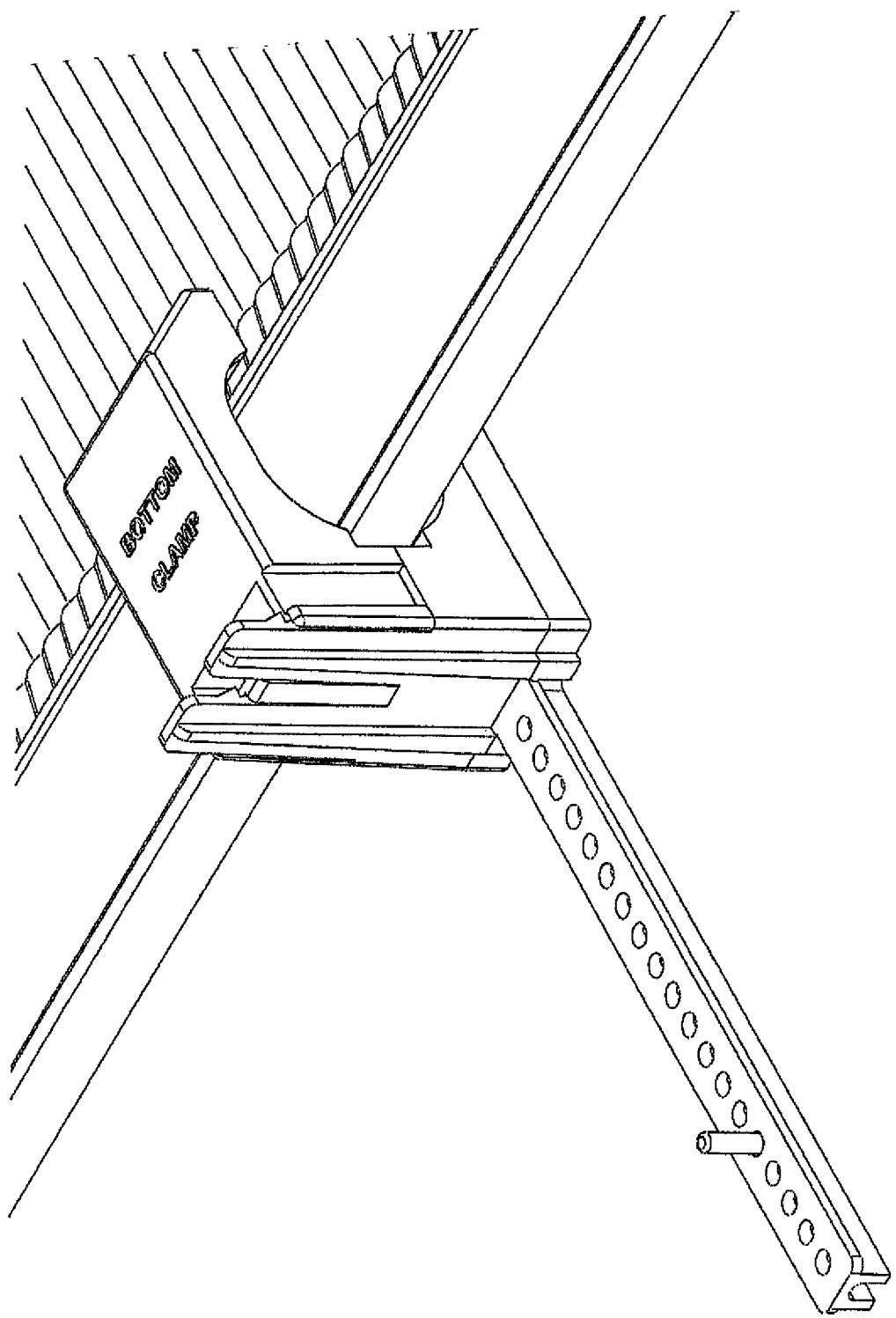
FIG. 16 is a topside view of the fixing arrangement in FIG. 15.
Figure 17:
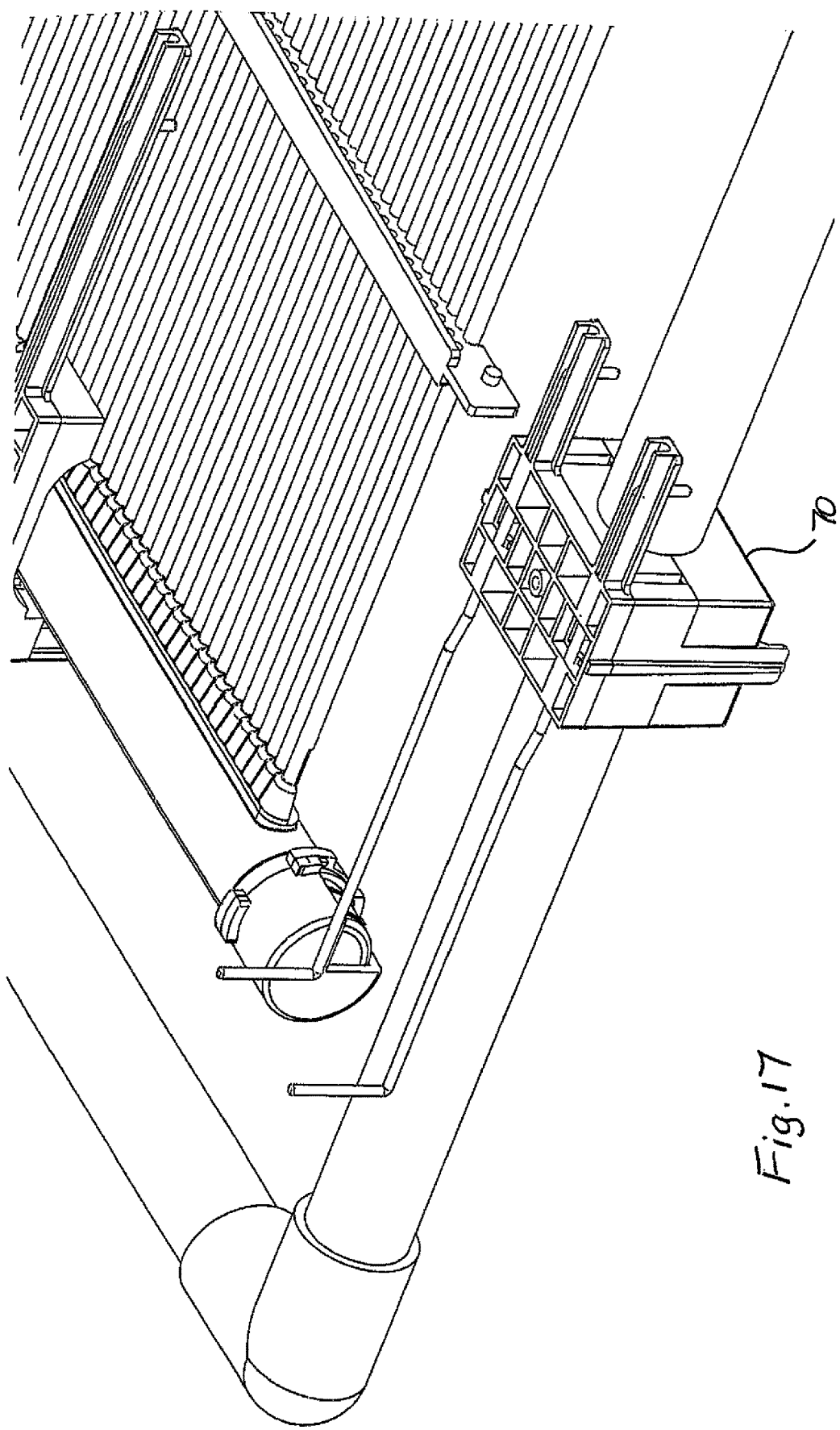
FIG. 17 is a further detail from FIG. 2 showing an arrangement for affixing the return pipe to the house roof.

The locking ring 50 has tapered internal recesses 52 to accommodate the tapered lugs 16 and 18 and has external grooves 53 to accommodate a turning tool 55. The tool 55 is seen in FIG. 11. The lugs 57 on the tool 57 engage the external grooves 53 of the locking ring 50. The locking ring 50 has the form of a cam lock nut. It is made of a glass filled nylon, which holds its memory under tension. An advantage of the cam lock system is that no matter what the strength of the installer, the cam lock cannot be either under or over tightened due to the notch lock. The same cannot be said for threaded couplings that are currently in use.

The internal recesses 52 are cammed so that a ⅛ turn of the nut 50 applies a sealing pressure on the joined ends with the triple seal of seal 14 and 0 rings 15. The length of the nut 50 provides support against bending of the manifolds at the join.

Clip-on clamps 72 tie the associated pipework 38 to nearby manifold portions.

FIGS. 12 to 17 illustrate the system for anchoring the assembled manifold and solar mat onto a tiled roof.

Figure 18:
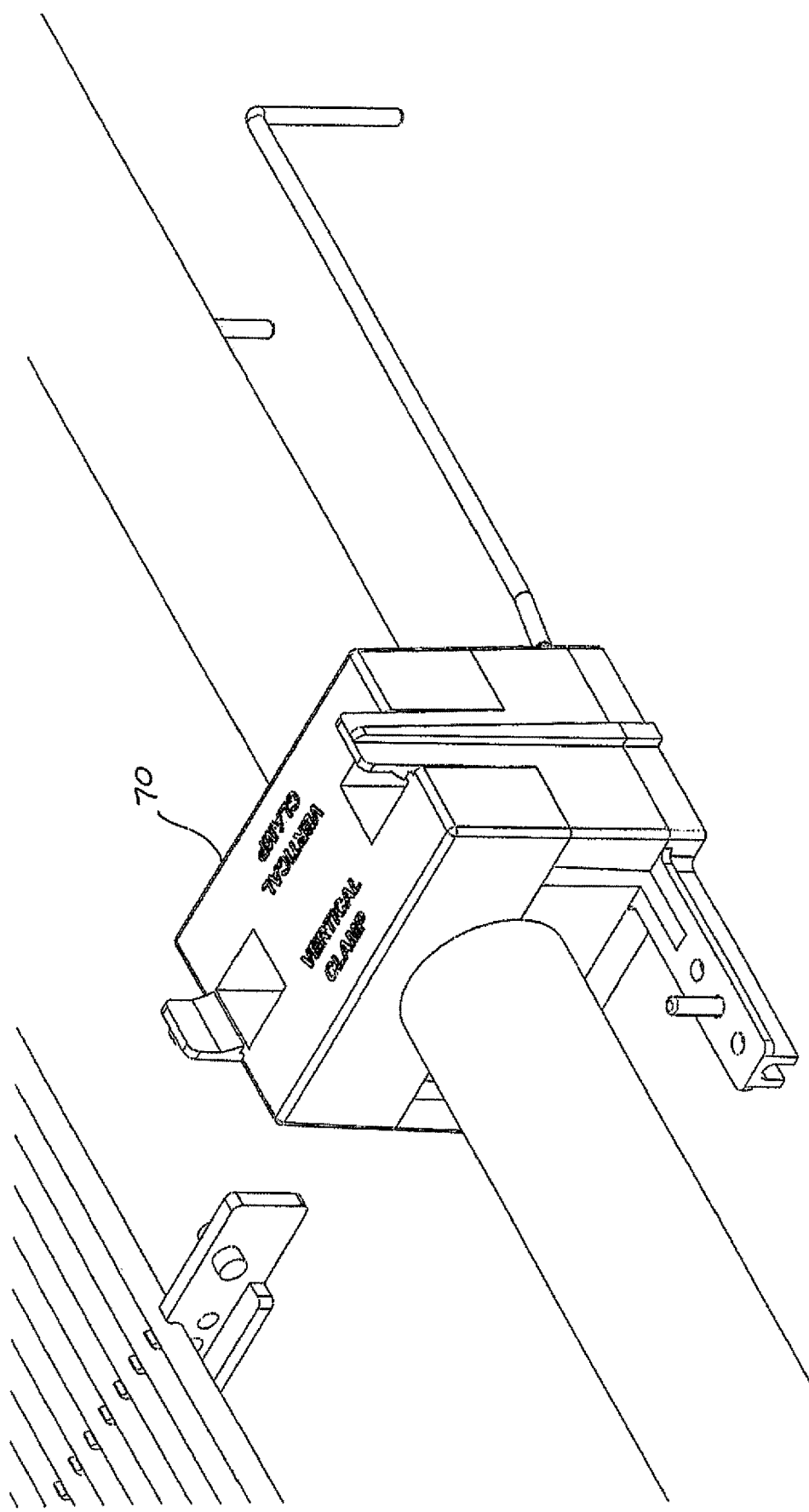
FIG. 18 is a topside view of part of the layout in FIG. 17.
Figure 19:
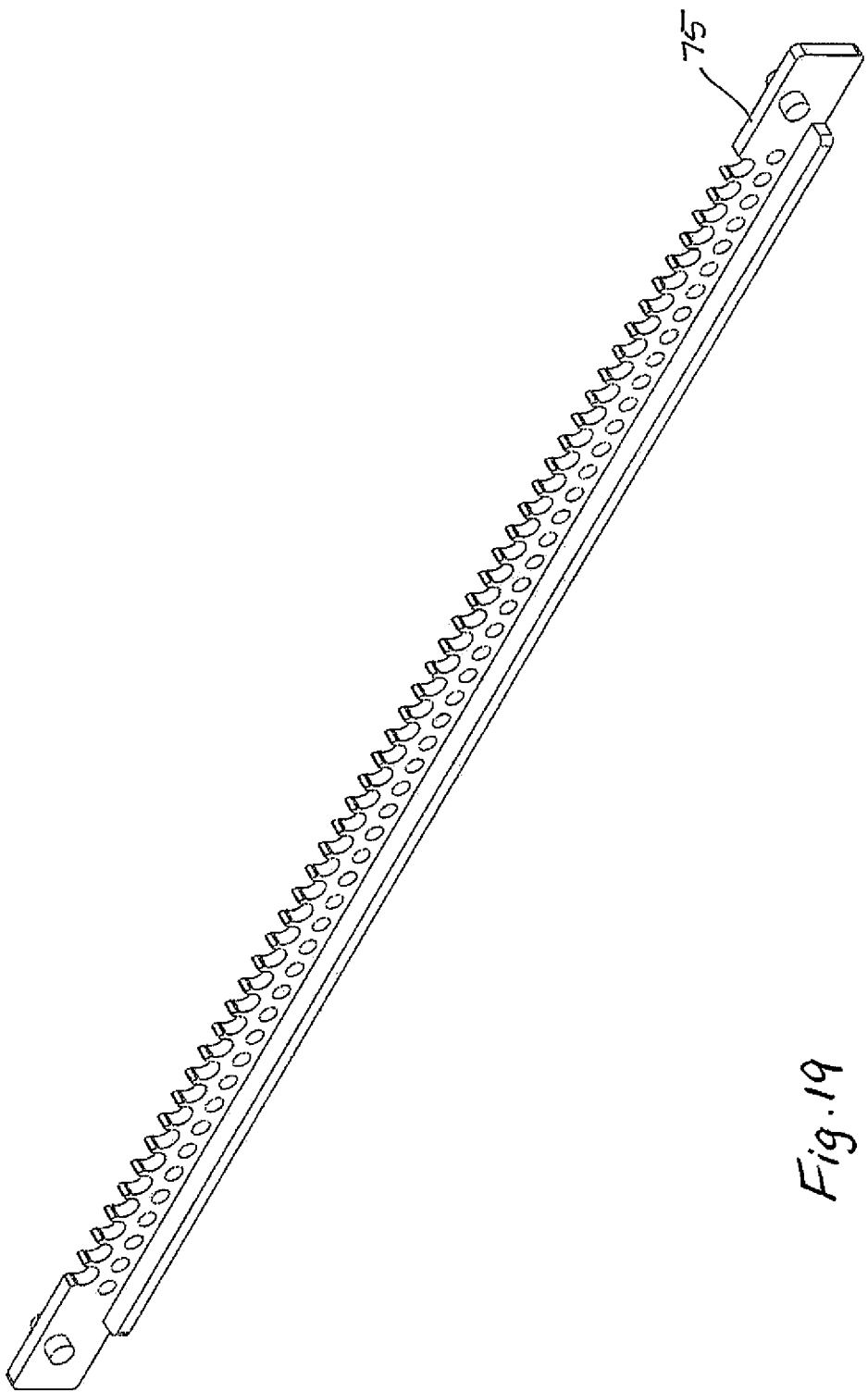
FIG. 19 is a view of a tube-spacer component of the assembly in FIG. 1.
Figure 20:
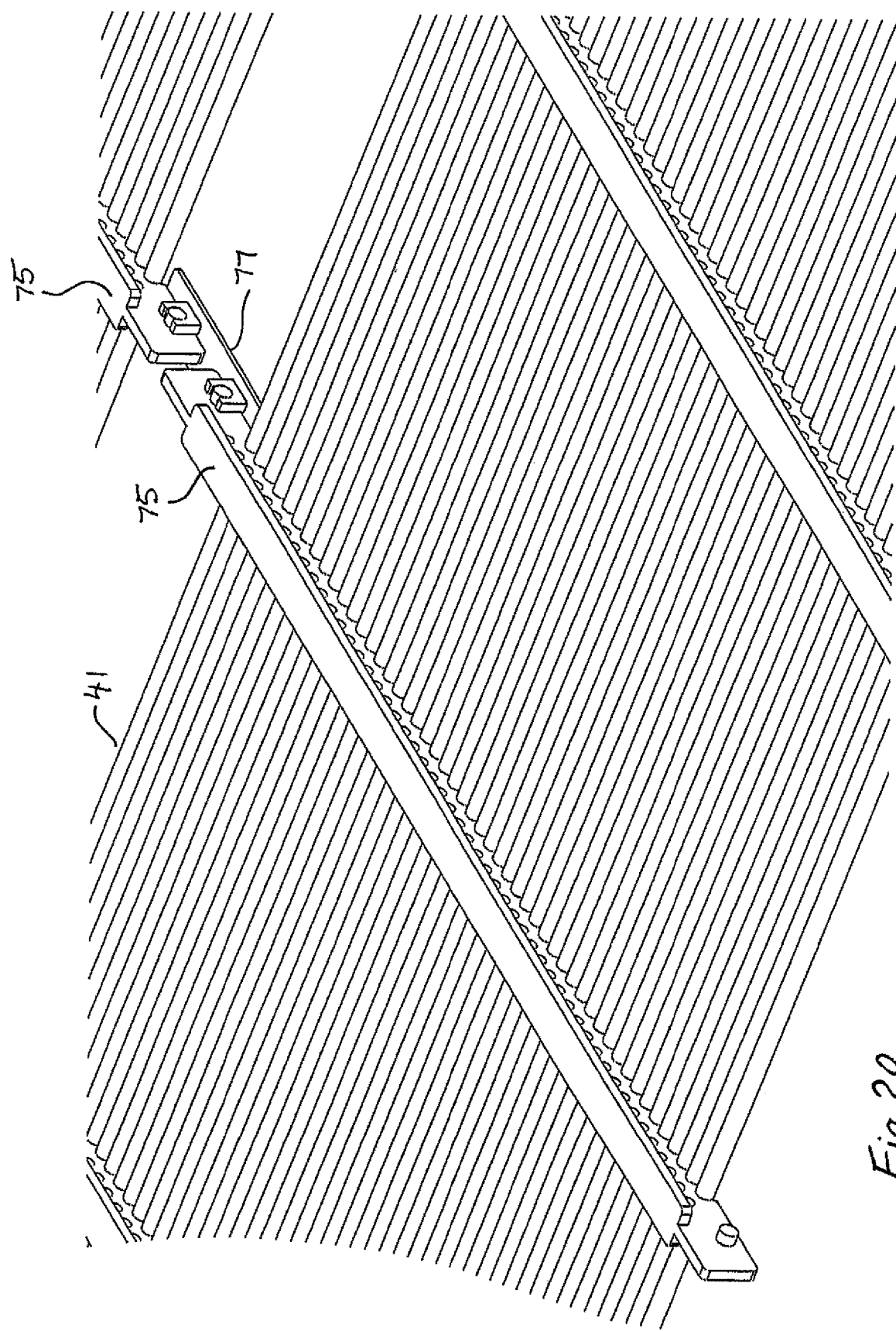
FIG. 20 is an enlarged detail from FIG. 2 showing the tube-spacer engaged with tubes in the assembly'
Figure 21:
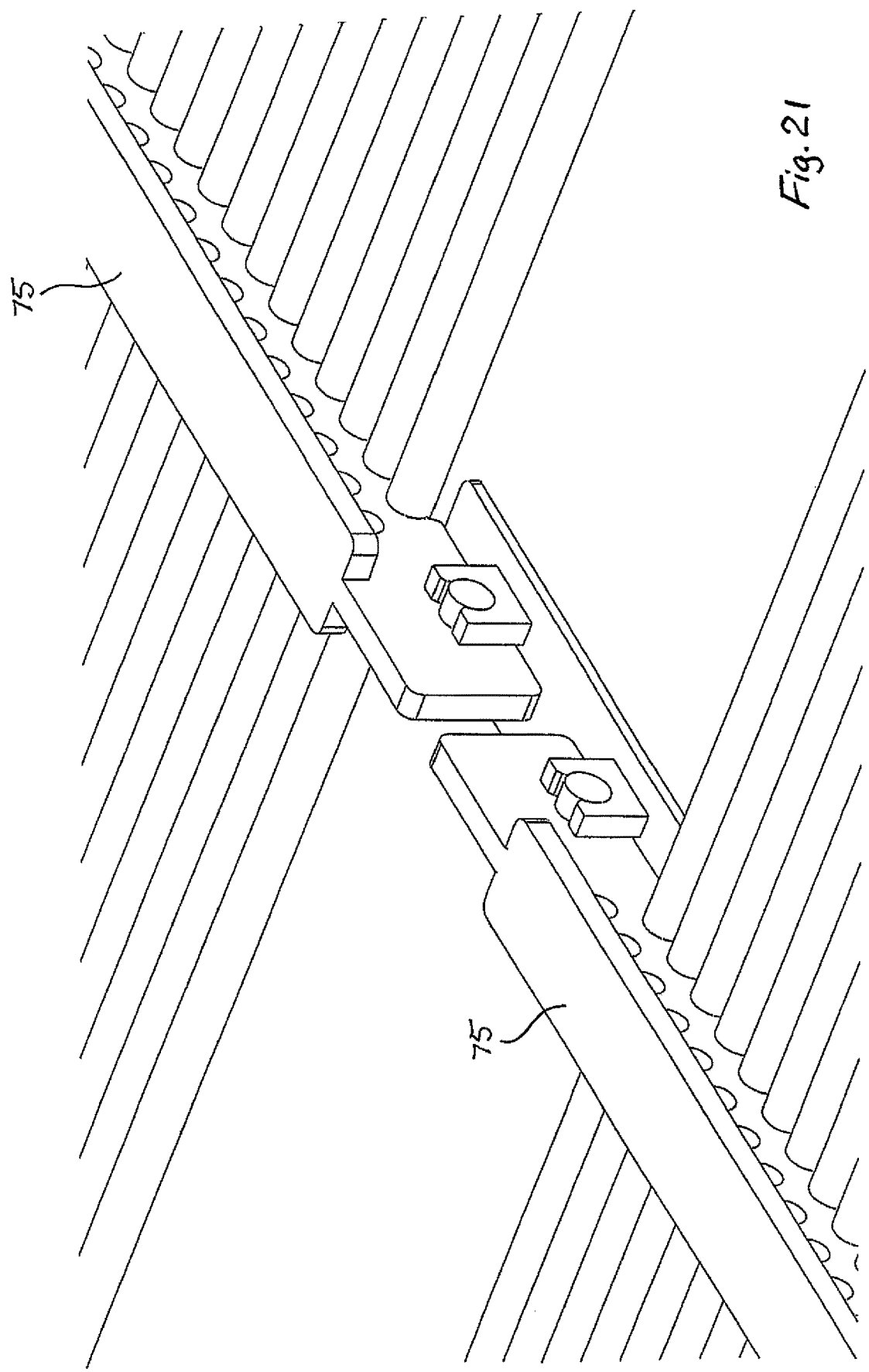
FIG. 21 is a further enlargement of portion of FIG. 20.
Figure 22:
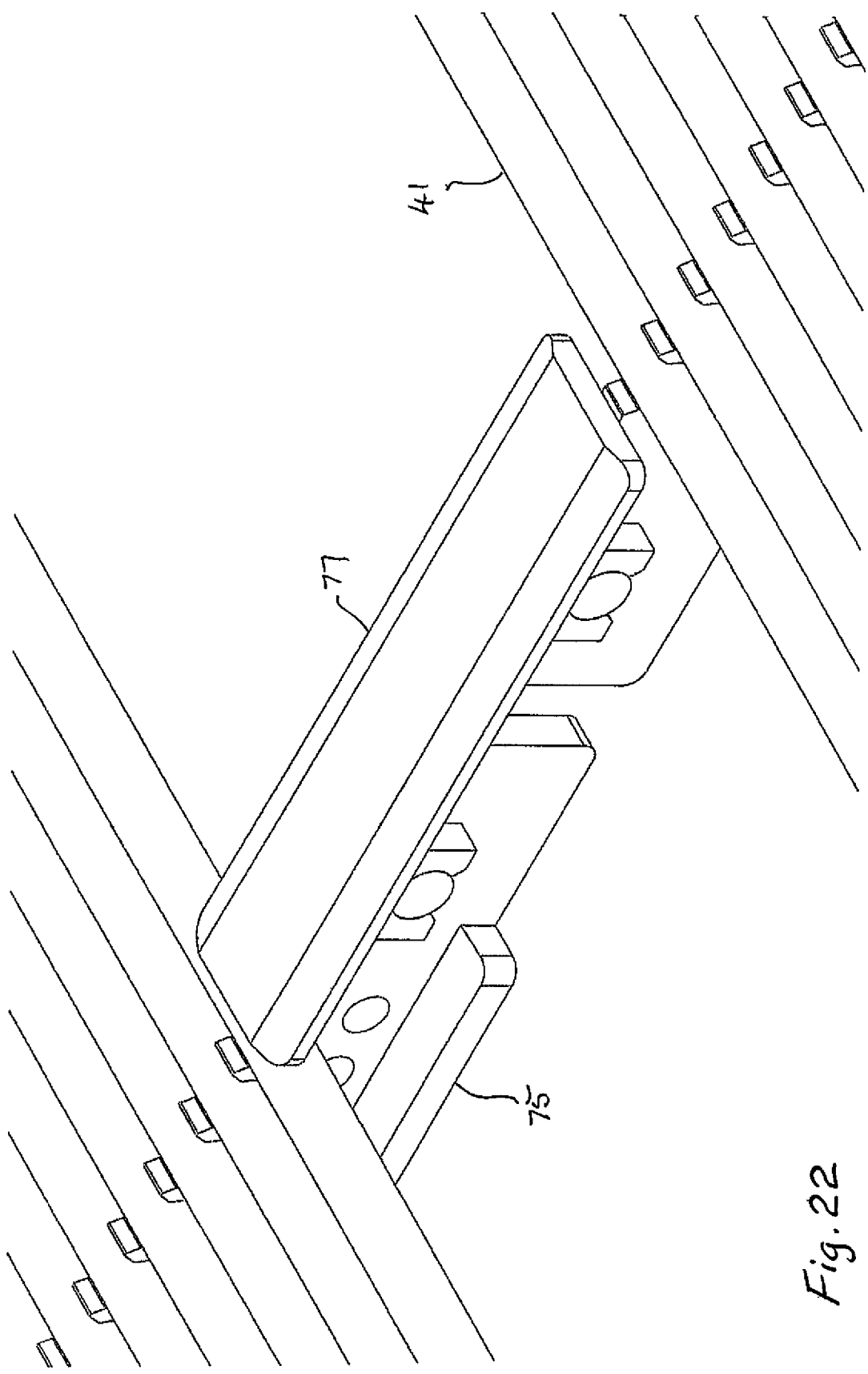
FIG. 22 is a topside view of the components in FIG. 21.

The clamp 60 consists of a base 61, which forms a lower jaw of the clamp, and an upper portion 62, which forms an upper jaw. A hook 66 engages a roof batten from between a pair of tiles and the adjustable slider 64 is set to apply tension to the mat 40. Spacers 75, into which the tubes engage, provide clearance between the mat 40 and the roof. Adjacent pacers are linked by linking members 77. The bracket 70 (see FIG. 18) is used to locate the return line relative to the manifold.

From the above it can be seen that the present invention addresses several of the problems encountered with prior art systems.

Whilst the above description includes the preferred embodiments of the invention, it is to be understood that many variations, alterations, modifications and/or additions may be introduced into the constructions and arrangements of parts previously described without departing from the essential features or the spirit or ambit of the invention. Those skilled in the art will realise that this invention may be implemented in embodiments other than those described without departing from the core teachings of this invention.

It will be also understood that where the word "comprise", and variations such as "comprises" and "comprising", are used in this specification, unless the context requires otherwise such use is intended to imply the inclusion of a stated feature or features but is not to be taken as excluding the presence of other feature or features.

The reference to any prior art in this specification is not, and should not be taken as, an acknowledgment or any form of suggestion that such prior art forms part of the common general knowledge.

The invention claimed is:

1. A method of manufacturing a solar heat exchanger comprising an array of tubes and an injection moulded plastics manifold, said manifold having a tubular manifold body with an array of spigots along its length, said method comprising:
   pushing onto said spigots on said manifold body corresponding ends of said tubes, each said spigot incorporating an external annular recess on the spigot, and
   overmoulding the spigots, and their corresponding ends of said tubes, with a flowable plastics compound to thereby seal the tubes to the manifold,
wherein said compound flows into said annular recesses.

2. The method according to claim 1 wherein each said recess is at the base of its respective spigot and adjacent said manifold body.

3. The method according to claim 1 wherein said manifold is a rigid injection moulding and said flowable plastics compound is cured during said overmoulding operation.

4. The method according to claim 3 wherein said flowable plastics compound chemically adheres to the spigots, the manifold body and the tubes.

5. The method according to claim 1 wherein said manifold is a rigid injection moulding and said flowable plastics compound is a thermoplastic elastomer.

6. The method according to claim 5 wherein said flowable plastics compound chemically adheres to the spigots, the manifold body and the tubes.

* * * * *